US012688609B2

(12) United States Patent
Gaarde et al.

(10) Patent No.: US 12,688,609 B2
(45) Date of Patent: Jul. 21, 2026

(54) SCANNING SYSTEM AND CALIBRATION THEREOF

(71) Applicant: 3SHAPE A/S, Copenhagen (DK)

(72) Inventors: Anders Gaarde, Søborg (DK); Johan Teichert Bondorf, Copenhagen (DK)

(73) Assignee: 3SHAPE A/S, Kobenhavn K (DK)

( * ) Notice: Subject to any disclaimer, the term of this patent is extended or adjusted under 35 U.S.C. 154(b) by 6 days.

(21) Appl. No.: 17/917,477

(22) PCT Filed: Apr. 7, 2021

(86) PCT No.: PCT/EP2021/059045
§ 371 (c)(1),
(2) Date: Oct. 6, 2022

(87) PCT Pub. No.: WO2021/204865
PCT Pub. Date: Oct. 14, 2021

(65) Prior Publication Data
US 2023/0083150 A1      Mar. 16, 2023

(30) Foreign Application Priority Data

Apr. 7, 2020    (EP) ..................................... 20168498

(51) Int. Cl.
*G06T 7/80*        (2017.01)
*A61C 9/00*        (2006.01)
(Continued)

(52) U.S. Cl.
CPC .............. *G06T 7/80* (2017.01); *A61C 9/0053* (2013.01); *G06T 7/337* (2017.01); *G06T 15/08* (2013.01);
(Continued)

(58) Field of Classification Search
CPC ........... G06T 7/80; G06T 7/337; G06T 15/08; G06T 2200/24; G06T 2207/10016;
(Continued)

(56) References Cited

U.S. PATENT DOCUMENTS

| | | | |
|---|---|---|---|
| 2001/0038705 A1 | 11/2001 | Rubbert et al. | |
| 2002/0006217 A1 | 1/2002 | Rubbert et al. | |
| | (Continued) | | |

FOREIGN PATENT DOCUMENTS

| | | |
|---|---|---|
| CN | 105741346 A | 7/2016 |
| CN | 108765474 A | 11/2018 |
| | (Continued) | |

OTHER PUBLICATIONS

Scaramuzza et al., "Extrinsic self calibration of a camera and a 3D laser range finder from natural scenes," 2007 IEEE/RSJ International Conference on Intelligent Robots and Systems, San Diego, CA, USA, 2007, pp. 4164-4169, doi: 10.1109/IROS.2007.4399276 (Year: 2007).*

(Continued)

*Primary Examiner* — Dave Czekaj
*Assistant Examiner* — Shanika M Brumfield
(74) *Attorney, Agent, or Firm* — BUCHANAN INGERSOLL & ROONEY PC

(57) ABSTRACT

Disclosed is a non-calibrated scanning system to be modified to a calibrated scanning system based on generating a three-dimensional representation of a three-dimensional calibration-object.

22 Claims, 5 Drawing Sheets

(51) Int. Cl.

| | |
|---|---|
| *G06T 7/33* | (2017.01) |
| *G06T 15/08* | (2011.01) |
| *G06T 19/20* | (2011.01) |
| *H04N 23/56* | (2023.01) |

(52) U.S. Cl.
CPC ............. *G06T 19/20* (2013.01); *H04N 23/56* (2023.01); *G06T 2200/24* (2013.01); *G06T 2207/10016* (2013.01); *G06T 2207/10028* (2013.01); *G06T 2207/30036* (2013.01); *G06T 2219/2016* (2013.01)

(58) Field of Classification Search
CPC . G06T 2207/10028; G06T 2207/30036; G06T 2219/2016; H04N 23/56; A61C 9/0053
See application file for complete search history.

(56) References Cited

U.S. PATENT DOCUMENTS

| | | | | |
|---|---|---|---|---|
| 2002/0180760 | A1 | 12/2002 | Rubbert et al. | |
| 2005/0043837 | A1* | 2/2005 | Rubbert | A61C 7/00 |
| | | | | 700/118 |
| 2007/0075997 | A1 | 4/2007 | Rohaly et al. | |
| 2014/0365140 | A1* | 12/2014 | Popilka | A61B 5/1079 |
| | | | | 702/19 |
| 2016/0063717 | A1 | 3/2016 | Sasaki et al. | |
| 2016/0150217 | A1* | 5/2016 | Popov | H04N 13/257 |
| | | | | 348/47 |
| 2017/0265970 | A1 | 9/2017 | Verker et al. | |
| 2018/0135965 | A1 | 5/2018 | Hillebrand et al. | |
| 2018/0313644 | A1* | 11/2018 | Glinec | A61C 9/006 |
| 2019/0269485 | A1* | 9/2019 | Elbaz | A61B 1/0638 |
| 2020/0158869 | A1* | 5/2020 | Amirloo Abolfathi | ...................... |
| | | | | G06T 7/521 |

FOREIGN PATENT DOCUMENTS

| | | | | |
|---|---|---|---|---|
| EP | 3040941 | A1 | 7/2016 | |
| EP | 3783385 | A1 * | 2/2021 | ............ G01S 17/87 |

OTHER PUBLICATIONS

D. Scaramuzza, A. Harati and R. Siegwart, "Extrinsic self calibration of a camera and a 3D laser range finder from natural scenes," 2007 IEEE/RSJ International Conference on Intelligent Robots and Systems, San Diego, CA, USA, 2007, pp. 4164-4169, doi: 10.1109/IROS.2007.4399276 (Year: 2007).*

T.C. de Souza Azevedo, "3D Object Reconstruction using Computer Vision: Reconstruction and Characterization Applications for External Human Anatomical Structures" PHD thesis, 2012. (256 pages).

L. Huang, et al., "Research on multi-camera calibration and point-cloud correction method based on three-dimensional calibration object" Optics and Lasers in Engineering, vol. 115, 2019, pp. 32-41.

S. Logozzo et al. "Recent advances in dental optics—Part I: 3D intraoral scanners for restorative dentistry", Internet citation, Jan. 1, 2014, pp. 203-221, XP002769584.

G. Medioni et al. "Emerging Topics in Computer Vision", published 2003. (667 pages).

R.Y. Tsai, "A Versatile Camera Calibration Technique for High-Accuracy 3D Machine Vision Metrology Using Off-the-Shelf TV Cameras and Lenses", IEEE Journal of Robotics and Automation, vol. 3, No. 4, Aug. 1987, pp. 323-344.

Z. Zhang, "A Flexible New Technique for Camera Calibration", Technical Report, Dec. 2, 1998, MSR_TR-98-71. (22 pages).

Z. Zhang, "A Flexible New Technique for Camera Calibration" IEEE Transactions on Pattern Analysis and Machine Intelligence, Nov. 2000, vol. 22, No. 11, pp. 1330-1334.

First Office Action issued on Jun. 12, 2025, by the Chinese Patent Office in corresponding Chinese Patent Application No. 202180031899.1, and an English Translation of the Office Action. (30 pages).

Gayathri et al., "Personal Authentication Using Partial Palmprint and Palmvein Images with Image Quality Measures", Intl. Conference on Computing and Network Communications (CoCoNet '15), Dec. 16-19, 2015, pp. 191-198.

Second Office Action issued on Oct. 20, 2025, by the Chinese Patent Office in corresponding Chinese Patent Application No. 2021800318991, and an English Translation of the Office Action. (30 pages).

Office Action issued in Korean Patent Application No. 10-2022-7038644, dated May 28, 2026 (8 pages).

* cited by examiner

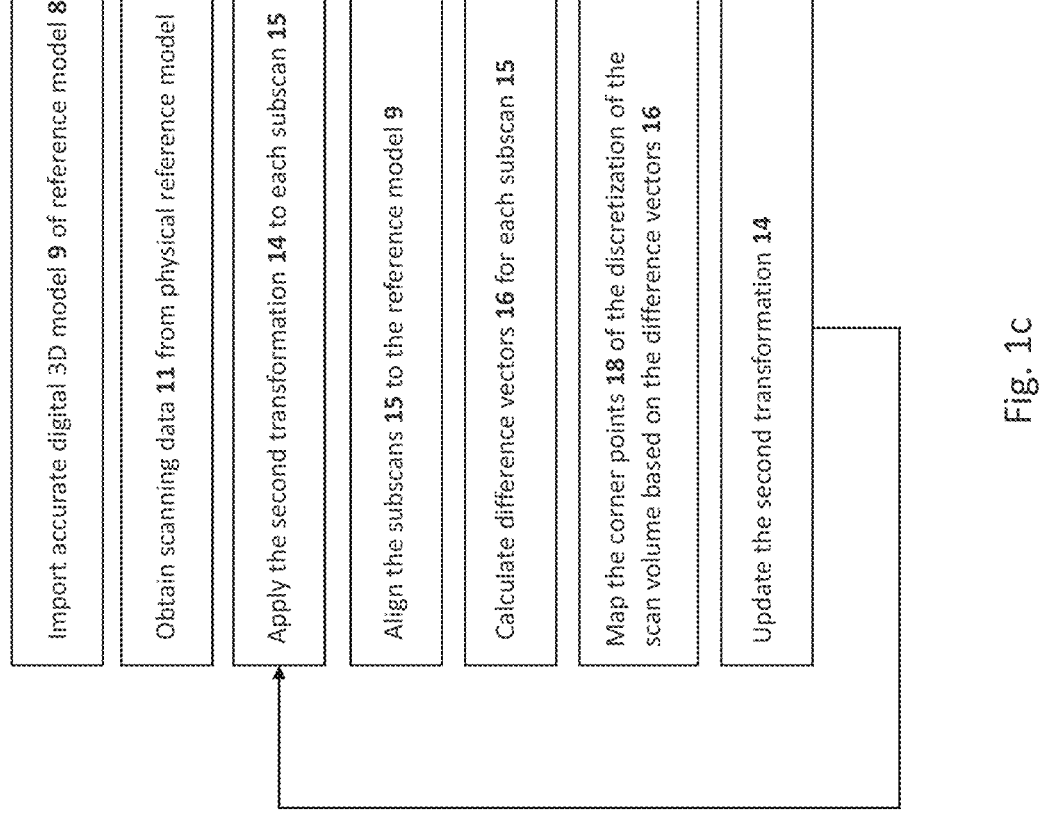

Import accurate digital 3D model 9 of reference model 8

Obtain scanning data 11 from physical reference model

Apply the second transformation 14 to each subscan 15

Align the subscans 15 to the reference model 9

Calculate difference vectors 16 for each subscan 15

Map the corner points 18 of the discretization of the scan volume based on the difference vectors 16

Update the second transformation 14

Fig. 1c

SCANNING SYSTEM AND CALIBRATION THEREOF

FIELD OF THE INVENTION

The present disclosure relates to a scanning system. More specifically, the scanning system of the present disclosure is to be modified to a calibrated scanning system.

BACKGROUND OF THE INVENTION

Calibration of scanning systems is well-known in the field of scanning, where scanning typically involves the use of a camera, such as an image camera, acquiring 2D images.

Further, camera calibration is a necessary step in 3D computer vision in order to extract metric information from 2D images.

Several books and journal articles in the field of calibration have been published over the time, for example the book "Emerging Topics in Computer vision", published 2003, edited by Gerard Medioni and Sing Bing Kang, of which chapter 2 is dedicated to camera calibration. Chapter is written by Zhengyou Zhang, who is known in the field of calibration and known for his paper on "A Flexible New Technique for Camera Calibration" in IEEE Transactions on Pattern Analysis and Machine Intelligence, December 2000, Vol 22: pp. 1330-1334 The therein disclosed technique for camera calibration, known as the Zhang method, has been used extensively in calibration of scanning system. The abstract of the Zhang article discloses very well the technique as follows:

"We propose a flexible new technique to easily calibrate a camera. It is well suited for use without specialized knowledge of 3D geometry or computer vision. The technique only requires the camera to observe a planar pattern shown at a few (at least two) different orientations. Either the camera or the planar pattern can be freely moved. The motion need not be known. Radial lens distortion is modeled. The proposed procedure consists of a closed-form solution, followed by a nonlinear refinement based on the maximum likelihood criterion. Both computer simulation and real data have been used to test the proposed technique, and very good results have been obtained. Compared with classical techniques which use expensive equipment such as two or three orthogonal planes, the proposed technique is easy to use and flexible. It advances 3D computer vision one step from laboratory environments to real world use."

Thus, the reason why Zhang's method has been used extensively in camera calibration is because it only requires a planar pattern to be moved, and is thus simple to perform, in particular because it does not require using a 3D-object, for example with two or three orthogonal planes. More importantly, as just described, the motion need not be known. Zhang's method was therefore also an improvement over another method known as the Tsai method, presented by R. Y. Tsai in the article "A versatile camera calibration technique for high-accuracy 3D machine vision metrology using off-the-shelf tv cameras and lenses" in IEEE Journal of Robotics and Automation, 3(4):323-344, August 1987.

Tsai's method is one of the most referenced calibration methods in literature, still used, and probably it was the first to include distortion in the camera model parameters: it considers radial distortion, modelled by a single coefficient. Tsai's method uses one plane with a checker pattern, but different from Zhang's method, the plane needs to be displaced at least once with known motion.

As can already be deduced from the above, calibration can be based on either a 2D-object or on a 3D-object. In chapter 2 of the book "Emerging Topics in Computer vision", Zhang describes calibration techniques that use 3D reference objects, 2D planes, and 1D lines, as well as self-calibration techniques. In relation to using a 3D-reference, Zhang explains that camera calibration is performed by observing a calibration object whose geometry in 3-D space is known with very good precision.

As a matter of fact, using a 3D-reference instead of a 2D-reference is, or was, the traditional way to calibrate a camera. For example, as described by Zhang in chapter 2 of the book "Emerging Topics in Computer vision", by using a 3D-reference made of two orthogonal planes, whereon a checker pattern is printed, and a 3D-coordinate system is attached (such that the coordinates of the checker corners are known very accurately in this coordinate system) a calibration can be made by performing four calibration-steps.

These four typical calibration-steps are:

(a) detect the corners of the checker pattern in each image;

(b) estimate the camera projection matrix P using linear least squares;

(c) recover intrinsic and extrinsic parameters A, R and t from P; and (d) refine A, R and t through a nonlinear optimization.

The intrinsic parameters (sometimes called external parameters) are orientation (rotation) and location (translation) of the camera, i.e., (R, t), which relates the world coordinate system to the camera coordinate system.

The extrinsic parameters (sometimes called internal parameters) are characteristics of the camera, from A (a matrix), typically with the elements $(\alpha, \beta, \gamma, u_0, v_0)$, where $(u_0, v_0)$ are the coordinates of the principal point, a and p the scale factors in image u and v axes, and $\gamma$ the parameter describing the skew of the two image axes.

In relation to the four calibration-steps (a-d), as also noted by Zhang, it is also possible to first refine P through a nonlinear optimization, and then determine A, R and t from the refined P. Further, it is also known that one can avoid corner detection by working directly in the image. For example, feature detection in the image is an option.

For calibration, Zhang recommends that the highest accuracy can usually be obtained by using a 3D reference, so it should be used when accuracy is indispensable and when it is affordable to make and use a 3D reference.

However, Zhang notes that calibration with a 2D reference seems to be the best choice in most situations because of its ease of use and good accuracy.

Nevertheless, if the purpose is to provide a scanning system with great accuracy, it is known in the field of scanning that one is required to use a 3D-reference (with features and/or edges), and one is recommended to perform the above four calibration steps (a-d). One example of a calibration method that relies on a 3D-reference with four checkerboards (i.e. with edges) on a cube is disclosed in the article "Research on multi-camera calibration and point-cloud correction method based on three-dimensional calibration object", in Optics and Lasers in Engineering 115 (2019) 32-41, by L. Huang et, al. The therein disclosed method corrects for errors in the point-cloud and not in the 2D-images. However, the calibration object as just describes still sets requirements for the calibration object, at least by design, and the scanning-device, since edge detection is a prerequisite for the calibration to be performed.

Thus, in the field of calibration, a calibration method that provides the best of two worlds is needed—the accuracy as obtained by using a 3D-reference, and the ease of use as obtained by using a 2D-reference. Further, in the field of calibration, a 3D reference that is cheaper and simpler to manufacture than a 3D-reference (with features and/or edges) is desirable. Even further, and according to the previous desire, in the field of calibration, a method that does not require the first step of the calibration step, i.e. the detection of corners or features, is desirable because it both requires a specific 3D-reference, and that the scanner is configured to perform a corner/feature detection of 3D-references. All in all, in the field of calibration, several improvements are needed and/or desired.

SUMMARY OF THE INVENTION

An objective of the present disclosure is to provide a scanning system and a method of calibrating such, whereby a calibrated scanning system is obtained. A further objective of the present disclosure is to provide the calibrated scanning system with high accuracy. Even further, the objective of the present disclosure is to provide a scanning system and a calibration thereof that is in accordance with the desires as explained in the background of the invention.

The present disclosure provides in a first aspect a scanning system that is configured to be calibrated using a 3D-reference, whereby the accuracy is improved over a scanning system that relies on a 2D-reference. Further, the present disclosure provides a scanning system and a method of calibrating such, where the method does not require a 3D-reference with specific predetermined features and/or corners/edges. Accordingly, the present disclosure provides a calibration method that has no specific feature requirements to the 3D-refence. All in all, the present disclosure provides an improved calibration-method for a scanning system, which is as simple as using a 2D-reference, and still provides the accuracy as obtained using a 3D-reference.

The present disclosure provides first a scanning system. In particular is disclosed a non-calibrated scanning system to be modified to a calibrated scanning system based on generating a three-dimensional representation of a three-dimensional calibration-object.

The scanning system comprises a scanning device, comprising: a light source configured to emit light, wherein the scanning device is configured to transmit the light onto an object; and an image-sensor comprising a plurality of sensor elements, wherein the image-sensor is configured to form a sequence of images of the object and the light as transmitted onto the object, wherein each image comprising a plurality of pixels; and a processor.

The processor is configured for performing a calibration by performing the steps, as will be explained in the following. In one embodiment, when the processor is in the mode of calibration, i.e. when the processor performs the calibration, the processor is informed that the object being scanned is the calibration-object.

A first step of the present disclosure is importing a reference three-dimensional representation of the calibration-object in a real-world-coordinate-system. No such step is disclosed in the typical calibration-steps (a-d) as explained in the background of the invention.

A second step of the present disclosure is registering the sequence of images into a registered sequence of images. At least the sequence of images is known from the typical calibration steps (a-d) because corners of the checker pattern are typically detected in each image, see step (b). However, registering the images is not a required step of the typical calibration steps (a-d), but in the present disclosure, the registration of the sequence images is needed to form a 3D-representation based from the sequence of the images. This is explained in the following next two steps, i.e. step three and four.

A third step of the present disclosure is transforming, using a first transformation, the registered sequence of images and at least a set of the pixels from each of said images to a dataset of coordinates of the calibration-object in the scanning-device-coordinate-system. For example, in one embodiment, a pixel may have a position defined by a coordinate set in the reference of the image sensor of the scanning-device, thus for example being $(u_0, v_0)$. A third coordinate in the scanning-device coordinate system, linked to the $(u_0, v_0)$ coordinate set, may for example be a position, $d_1$, of a focus lens, whereby the dataset of coordinates of the calibration-object may be $(u_0, v_0, d_1)$. Alternatively, a third coordinate in the scanning-device coordinate system, linked to the $(u_0, v_0)$ coordinate set, may for example be a displacement, $d_2$, of the coordinate $(u_0, v_0)$ set in relation to an expected coordinate set, whereby the dataset of coordinates of the calibration-object may be $(u_0, v_0, d_2)$. The typical calibration steps (a-d) involve a first transformation of images, not necessarily registered, to at least a spatial coordinate set in the reference of the image sensor, whereby $(u_0, v_0)$ is provided.

A fourth step of the present disclosure is transforming, using a second transformation, the dataset of coordinates of the calibration-object in the scanning-device-coordinate-system to a point-cloud of the calibration-object in a real-world-coordinate-system. In a preferred embodiment, the second transformation transforms triangulated point-clouds to triangulated point clouds. The effect of using such a second transformation is to remove discretization errors. A point-cloud is possible to obtain once the intrinsic and extrinsic parameters are at least roughly obtained, as the point-cloud is based on the transformation between an object in 3D space and the 2D image observed by the camera from visual information (images). In other words, by roughly knowing the extrinsic parameters from the matrix A, with both $(u_0, v_0)$ and the parameters $(\alpha, \beta, \gamma)$, and the intrinsic parameters $(R, t)$, a transformation of $(u_0, v_0)$ to a point-cloud is possible. Thus, the fourth step according to the present disclosure relies on a second transformation that in principle at least has an estimate of the intrinsic and extrinsic parameters. However, these parameters may be estimated values, for example based on transformations from previous scanning-devices. Further, these parameters need not to be identical to the intrinsic and extrinsic parameters as are known in the articles by Zhang or Tsai. There are many parameters which can be used to describe a transformation—even Zhang and Tsai describe different parameters. Further, in some cases, a transformation can be based on explicit methods (where all parameters are obtained, as in Tsai's method) and in other cases, a transformation can be based on implicit methods (where not all parameters are determined, as in Zhang's method), see for example "3D Object Reconstruction using Computer Vision: Reconstruction and Characterization Applications for External Human Anatomical Structures", a PhD thesis by Teresa Cristina de Sousa Azevedo, from 2012, characterizing different calibration methods. The parameters, defining the second transformation, need not to be fine-calibrated or refined. Thus, this is what defines the presently disclosed non-calibrated scanning system to be modified to a calibrated scanning system based on generating a three-dimensional representation of a three-dimensional calibration-object.

In comparison with the typical calibration steps (a-d), the presently disclosed scanning system need not to (b) estimate the camera projection matrix P using linear least squares: it does not need to (c) recover intrinsic and extrinsic parameters A, R and t from P; and it does not need to (d) refine A, R and t through a nonlinear optimization. The presently disclosed scanning system simply needs a second transformation that is configured to generate a point cloud. The generated point cloud, as generated using the presently disclosed scanning system, may very well be differ from the imported three-dimensional representation of the calibration-object in the real-world-coordinate-system. This is in fact to be expected because the scanning system according to the present disclosure is non-calibrated up till this fourth step. However, in some embodiments, the intrinsic and extrinsic parameters may be established using one or more of the first three typical calibration-steps (a-c) as previously described. The fourth step of the typical calibration-steps, i.e. (d) to refine A, R and t through a nonlinear optimization, can easily be dispensed with, whereby the presently disclosed scanning system up till this step is still to be defined as the non-calibrated scanning system to be modified to a calibrated scanning system based on generating a three-dimensional representation of a three-dimensional calibration-object. The presently disclosed scanning system and the method for calibrating it is thus so far (because calibration has not yet begun) much simpler than the typical calibration, defined by the four steps (a-d). However, in the next steps to be disclosed, calibration will be initiated and finalized.

In a fifth step of the present disclosure, the point-cloud of the calibration-object in the real-world coordinate-system is aligned to the reference three-dimensional representation of the calibration-object in the real-world-coordinate-system using an alignment-procedure. This fifth step is not a part of the typical calibration with the four typical steps (a-d), particularly because the reference three-dimensional representation of the calibration-object in the real-world-coordinate-system is not imported in the typical calibration method using the four typical steps (a-d). Further, in the fifth step of the present disclosure, the alignment procedure is based on minimizing a first difference between the reference three-dimensional representation and the point-cloud. This fifth step differs fundamentally from the step (b) of the typical calibration, even if a three-dimensional reference object is used, because in the presently disclosed scanning-system, the minimization is taking place in the 3D-world coordinate space, and not in the typical 2D image-space. To elaborate on this, the typical calibration is based on (a) detecting the corners of the checker pattern in each image, and from these images (b) estimate the camera projection matrix P using linear least squares. The presently disclosed method apply minimization in 3D space instead of 2D space. The inventors of the present invention have realized that when minimization is performed in the 3D-space, then the precision of the final point-cloud (as will be calibrated) is greatly improved over calibration that is based on minimization in the 2D-space.

As previously explained, the disclosure by L Huang et al. relies on a 3D-reference object with edges of four checkerboards on a cube but does not disclose an alignment step (because the coordinates of the cube are directly obtained from the feature detection of the edges). Therefore, L. Huang et al neither discloses a minimization step as defined by the presently disclosed method. However, L. Huang et al. does disclose a comparison between the feature points on the cube and the point-cloud as generated, whereby the rotation and translation matrix are obtained and refined. The refinement is based on minimizing the difference between the feature points on the cube and the point-cloud as generated.

In this refinement, the comparison is made between a plane of the standard features and the plane of reconstructed features. This minimization/refinement can only be made because planar surfaces with known features are a part of the reference 3D-object. Even if the comparison is seen as an alignment procedure, then it must be emphasized that the alignment procedure, in L. Huang is for refinement and not for generating the three-dimensional representation. Accordingly, the presently disclosed scanning system therefore differs from the L. Huang disclosure. To sum it up, L. Huang et al. avoids an alignment procedure in the generation of the 3D-representation, and places instead requirements on the 3D-object.

The present disclosure avoids the requirements of the 3D-object, and consequently places requirements on an alignment procedure. The advantages of shifting the requirements to the software instead of the physical world are many. First of all, one needs not to design a special 3D calibration object as required by L. Huang et al. Secondly, the software only needs to be programmed once. Thirdly, the cost of software programming is much lower than the manufacturing of a specially designed calibration object. Finally, both the accuracy and ease of use of using an alignment procedure on a reference 3D reference object (as programmed in software), rather than using a specially designed 3D calibration object, is dramatically improved.

Once the calibration is initiated using the above described fifth step of the present disclosure, i.e. the alignment step, the actual calibration can begin and be finalized. This is described in the next two steps.

A sixth step of the present disclosure is deriving, after using the alignment-procedure, a second difference between the point-cloud and the reference three-dimensional representation of the calibration-object in the real-world-coordinate-system. This second difference may be informative of how much the individual points in the generated point-cloud differs from the corresponding points on the reference three-dimensional representation of the calibration-object in the real-world-coordinate-system.

A seventh step of the present disclosure is modifying, based on the second difference, the second transformation to a calibrated transformation, whereby the location of points in the point-clouds of the calibration-object in the real-world-coordinate-system is adjusted in three dimensions, whereby the non-calibrated scanning device is modified to a calibrated scanning device.

After the non-calibration scanning device is modified to a calibrated scanning device, the calibrated scanning device is able to generate, based on the calibrated transformation, a calibrated three-dimensional representation of the calibration-object in the real-world-coordinate-system, whereby a difference between the calibrated three-dimensional representation of the calibration-object in the real-world-coordinate-system and the reference three-dimensional representation of the calibration-object in the real-world-coordinate-system is reduced.

In a second aspect of the present disclosure is provided a system for obtaining a calibrated scanning system, comprising: the non-calibrated scanning system according to the first aspect; and a three-dimensional calibration-object.

In a third aspect of the present disclosure is provided a calibrated scanning system for generating a three-dimensional representation of an intraoral object, wherein the calibrated scanning system is provided by modifying the non-calibrated scanning system according to the first aspect, whereby the calibrated scanning system comprises: a scanning device, comprising: a light source configured to emit light, wherein the scanning device is configured to transmit the light onto an object; and an image-sensor comprising a plurality of sensor elements, wherein the image-sensor is configured to form a sequence of images of the object and the light as transmitted onto the object, wherein each image comprising a plurality of pixels; and a processor configured for performing the steps of: registering the sequence of images; transforming, using a first transformation, the registered sequence of images and at least a set of the pixels to a dataset of coordinates of the object in the scanning-device-coordinate-system; transforming, using the calibrated transformation, the dataset of coordinates of the object in the scanning-device-coordinate-system to a point-cloud of the object in a real-world-coordinate-system, and generating, based on the calibrated transformation, a calibrated three-dimensional representation of the object in the real-world-coordinate-system.

In a fourth aspect of the present disclosure is provided a method of calibrating a non-calibrated scanning system by performing the steps of: providing, the system according to the second aspect, thereby the non-calibrated scanning system and the three-dimensional calibration-object; and scanning the three-dimensional calibration-object using the non-calibrated scanning system, thereby scanning the three-dimensional calibration-object by using the scanning device, and thereby using the processor in the non-calibrated scanning system to perform the calibration, obtaining the calibrated scanning device according to the third aspect.

In a fifth aspect of the present disclosure is provided a computer-implemented method for calibrating a scanner device, displayed in a graphical user-interface on a screen, comprising the steps of: obtaining reference-data of a reference 3D-representation of a three-dimensional-calibration-object; forming, in the graphical user-interface and based on the reference-data, a reference 3D-representation of the three-dimensional calibration-object; obtaining, based on the handheld device being used by a user to scan the three-dimensional calibration-object, and from one or more device-to-real-world coordinate transformation(s) of 2D-images of the three-dimensional calibration-object, measurement-data.

Further, the computer-implemented method comprising the steps of aligning, using an alignment-procedure, the measurement-data to the reference-data to obtain alignment-data; updating, based on the alignment-data, said one or more transformation(s), thereby calibrating the scanner device.

Even further, the computer-implemented method comprises the steps of displaying, in the graphical user-interface, an indicator to the user from which the user is guided to continue scanning the three-dimensional-calibration-object; and displaying, in the graphical user-interface, a notification indicating that the calibration of the scanner device is completed.

The step of displaying the indicator to the user from which the user is guided to continue scanning may be performed before, during and after the step of aligning. In particular, the order of the steps may be interchanged, and one or more of the steps may be repeated several times. By guiding the user to continue scanning, an optimal method for calibration a scanner device is hereby disclosed.

BRIEF DESCRIPTION OF THE DRAWINGS

The above and/or additional objects, features and advantages of the present invention, will be further described by the following illustrative and non-limiting detailed descrip-

Figure 1A:
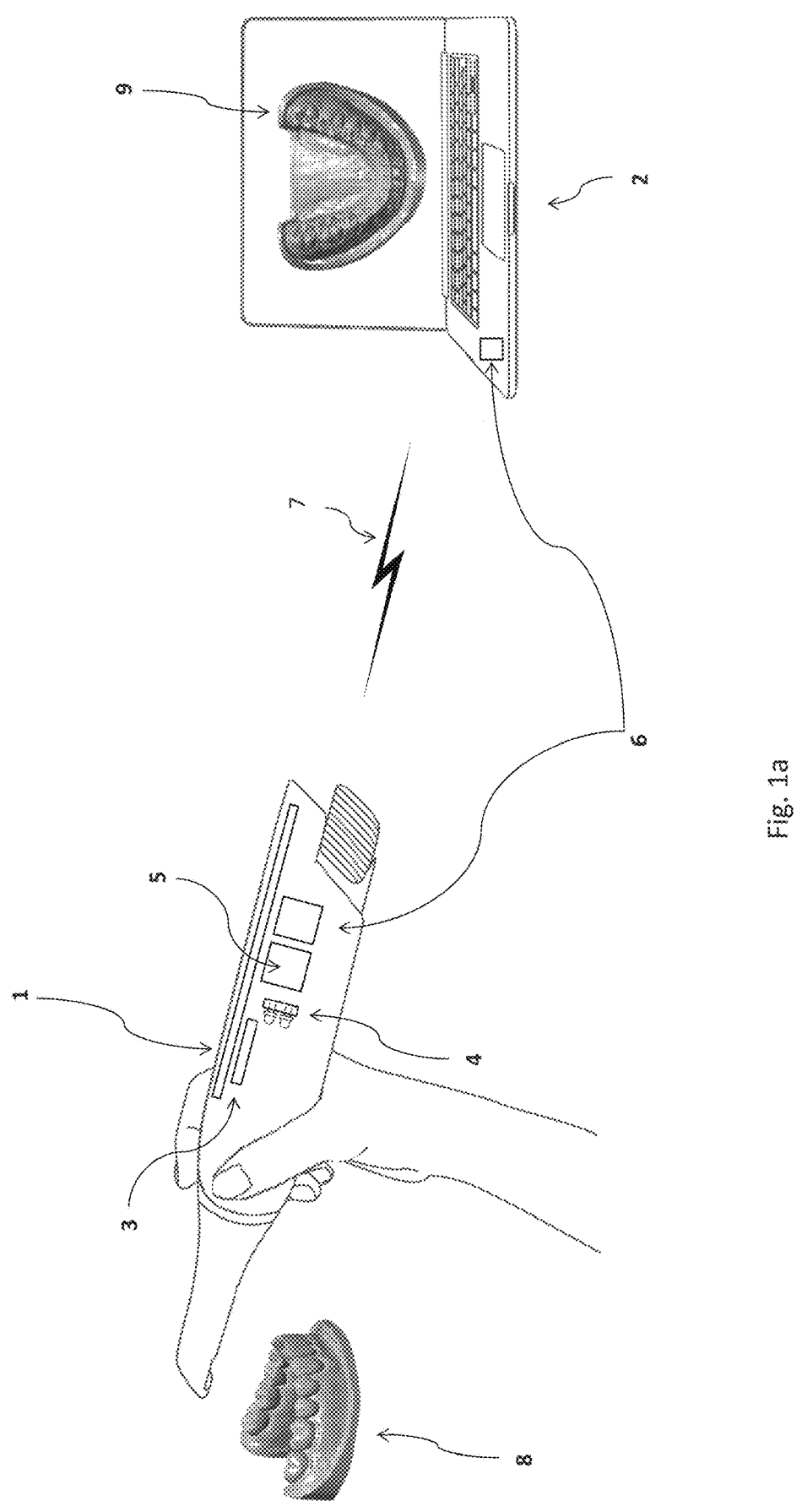

8 tion of embodiments of the present invention, with reference to the appended drawing(s), wherein:

FIG. 1a shows a first example of a non-calibrated scanning system configured to be calibrated using a 3D-reference according to the present disclosure.

Figure 1B:
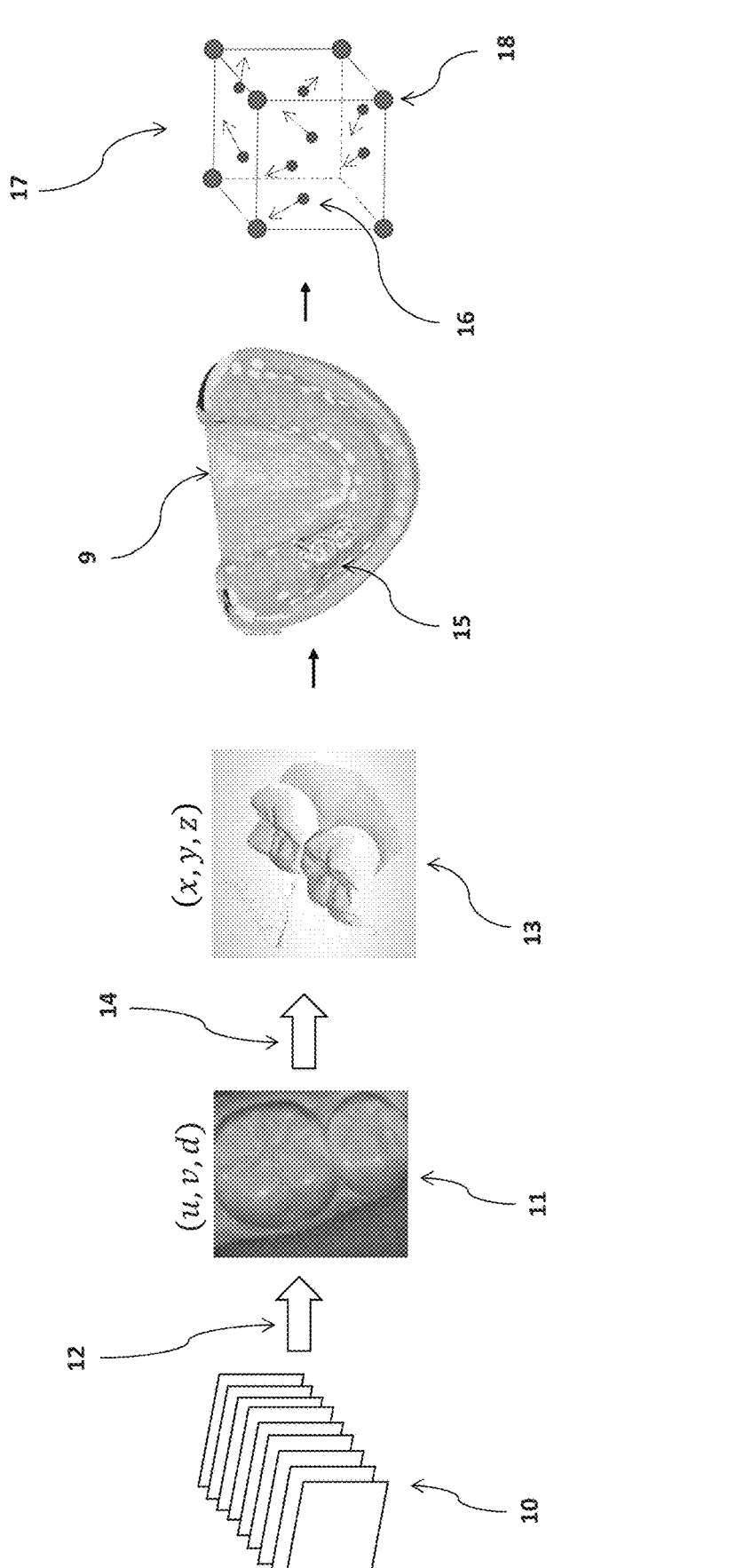

FIG. 1b shows an example of a calibration method according to the present disclosure.

FIG. 1c shows an example of details of a calibration method according to the present disclosure.

Figure 2:
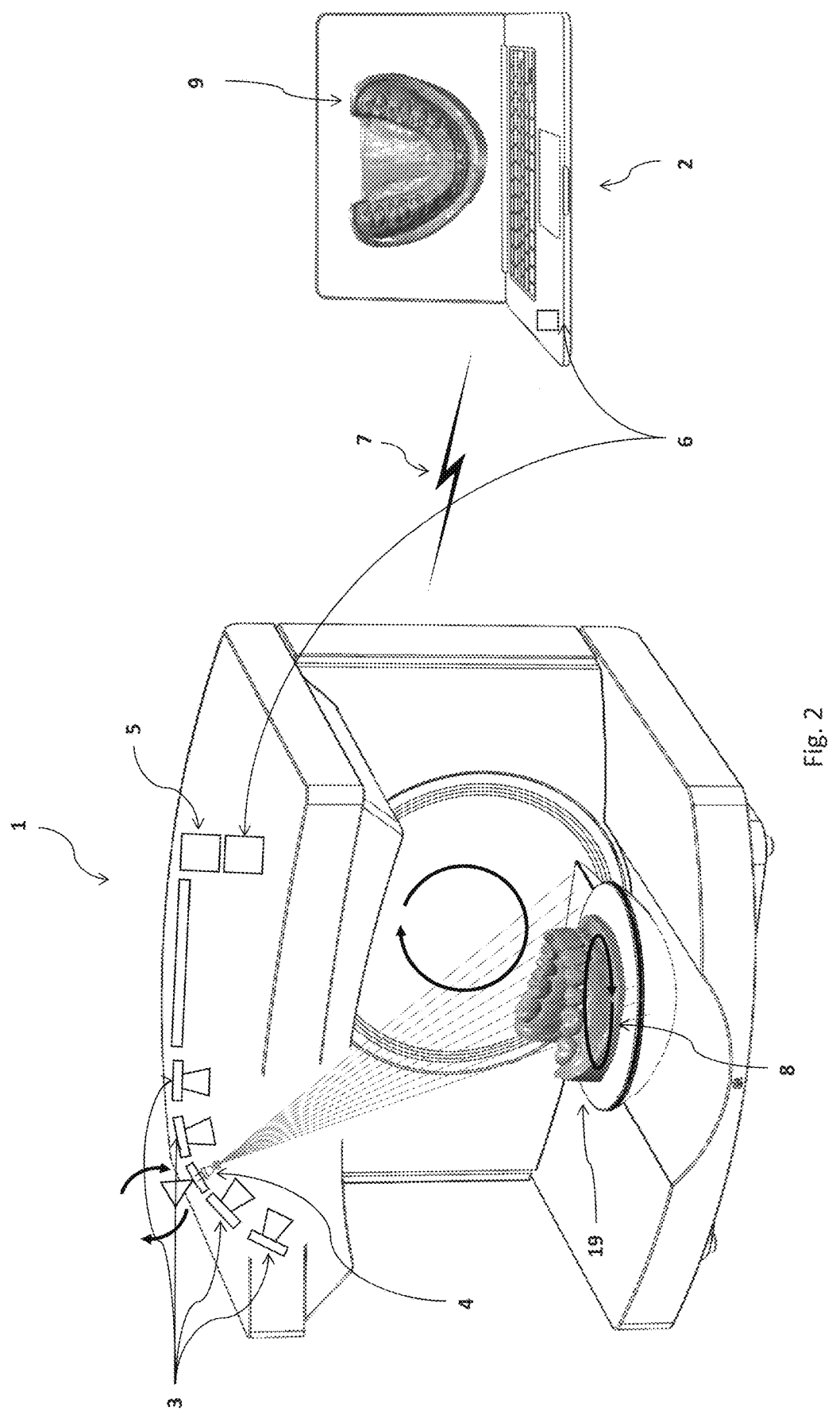

FIG. 2 shows a second example of a non-calibrated scanning system configured to be calibrated using a 3D-reference according to the present disclosure.

Figure 3:
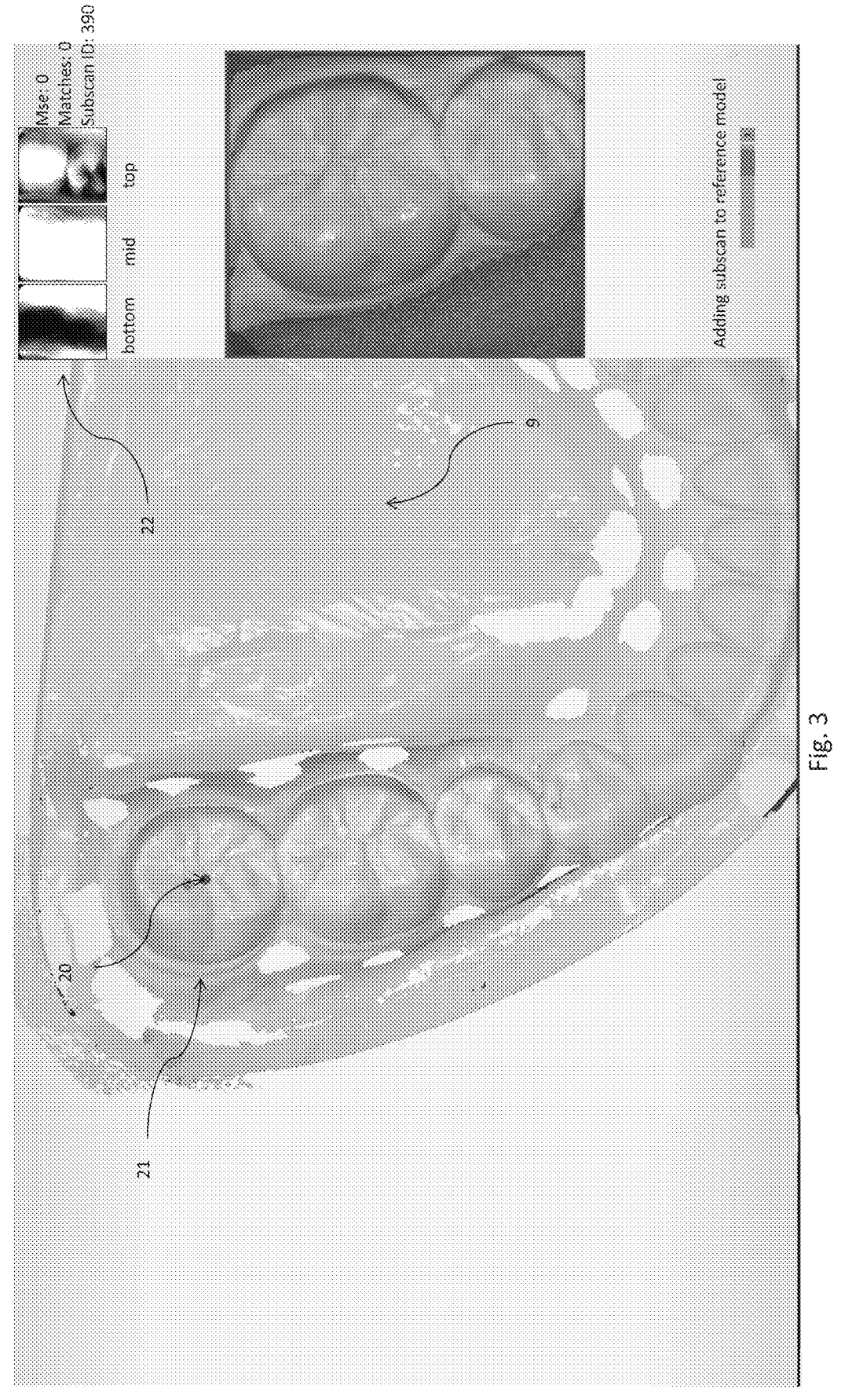

FIG. 3 shows an example of a user-interface, displaying guidance for performing scanning related to calibrating a scanning-device of the present disclosure.

DETAILED DESCRIPTION

Scanner Device

In one embodiment, the scanning device is a handheld scanning device. For example, the scanning device may be an intraoral scanner. Accordingly, the non-calibrated scanning device may be an intraoral scanning device.

In a preferred embodiment, the image-sensor of the scanner device is located in a plane normal to a z-direction in the scanning-device-coordinate-system, and an optical element is configured to move relative to the image-sensor and along the z-direction, whereby the sequence of images of the object is formed while the optical element is moved.

In a more preferred embodiment, and related to the above described preferred embodiment, the processor is further configured to: stack the registered sequence of images along the z-direction in the scanning-device-coordinate-system to form a volume, wherein each image in the registered sequence of images comprises a layer in the volume, whereby the volume is comprised of a sequence of plurality of pixels; compute a focus-measure for: each of the plurality of pixels within the volume, or each of a plurality of groups of pixels within the volume, wherein each of the plurality of group of pixels is formed by a subset of the plurality of pixels; compute, based on the focus-measure, a maximum focus-measure, $z_m$, for: each of the plurality of pixels within the volume, whereby a subset of the plurality of pixels gets associated with $z_m$, or each of the plurality of group of pixels within the volume, whereby a subset of the plurality of pixels gets associated with $z_m$, whereby, using the first transformation, the subset of the plurality of pixels that have been associated with $z_m$ is the at least set of pixels that are transformed to the dataset of coordinates of the object in the scanning-device-coordinate-system.

Reference Three-Dimension Representation

In one embodiment, the step of importing a reference three-dimensional representation of the calibration-object in the real-world-coordinate-system is based on importing a high-precision three-dimensional representation of the calibration-object from a scanning system that differs from the non-calibrated scanning system. For example, as described above, the non-calibrated scanning system may comprise a scanner device being handheld, such as an intraoral scanner, and the high-precision three-dimensional representation may then be obtained from a scanner device, such as a stationary lab scanner or a GOM scanner.

Alignment Procedure and Transformations

In one embodiment, the alignment procedure is based on aligning the point-cloud to the reference three-dimensional representation by a point-to-plane registration or a point-to-point registration.

In another embodiment, the step of modifying the second transformation to a calibrated transformation, whereby the location of points in the point-cloud of the object in the real-world-coordinate-system is adjusted in three dimensions, is performed by individually adjusting each of the points in the point-cloud. Such an approach is more flexible than if the adjustment was dependent on various parameters. Due to the more flexible solution as described in this embodiment, the precision of the scanning device, after calibration has been performed, is significantly improved.

In yet another embodiment, the step of modifying the second transformation to a calibrated transformation, whereby the location of points in the point-cloud of the object in the real-world-coordinate-system is adjusted in three dimensions, is performed by adjusting the three dimensional location simultaneously in three directions for each point in the point-cloud. Such an approach is more accurate than if the adjustment was done step-by-step, i.e. non-simultaneously. Accordingly, by this approach, the precision of the scanning device, after calibration has been performed, is significantly improved.

In a preferred embodiment, the step of modifying the second transformation to a calibrated transformation, whereby the location of points in the point-cloud of the object in the real-world-coordinate-system is adjusted in three dimensions, is performed by adding a correction-vector, comprising three direction-components, to each of the points in the point-cloud. This approach implies that the adjustment is simplified and thus makes the calibration method faster and more efficient.

In some embodiments, and where the scanner device comprises an optical element that moves during scanning, the step of modifying the second transformation to a calibrated transformation, whereby the location of points in the point-cloud of the object in the real-world-coordinate-system is adjusted in three dimensions, is associated with a position along the z-direction of the optical element due to the sequence of images of the calibration-object is formed while the optical element is moved.

In other embodiment, and where the scanner device comprises an optical element that moves during scanning, the adjustment in three dimensions, as associated with a position along the z-direction of the optical element, is defined by a higher order polynomial for each of said positions along the z-direction. This embodiment ensures that the adjustment can be applied efficiently and therefore it provides a fast scanning device.

In a most preferred embodiment, the step of modifying the second transformation to a calibrated transformation, is defined by a look-up-table. This embodiment ensures that the adjustment can be applied efficiently and therefore it provides a fast scanning device.

Calibration System

In a most preferred embodiment, in particular in embodiments where the scanning device is an intraoral scanner, the three-dimensional calibration-object is in the shape of a dentition comprising a plurality of dental oral objects. The three-dimensional calibration object then resembles the object to be scanned after calibration, and by resembling this, it has been found that the calibration is very precise.

User-Interface

In one embodiment, the computer implemented method further comprises the step of forming, in the graphical user-interface and based on the alignment-data and/or said updated transformation(s), a 3D-representation of at least a part of the three dimensional calibration-object, such that said at least part can be seen in comparison to the displayed reference 3D-representation. This may both show to the user where on the reference 3D-representation the alignment was successful and where the user could also scan away from. By scanning away from regions where alignment was successful, the calibration may be even further improved. The reason for this is that the calibration then relies on different 3D-structures of the calibration-object, and consequently adjust the transformations to these structures.

In a second embodiment, the computer-implemented method comprises repeating one or more of said steps a plurality of times until a pre-defined criterion is satisfied. For example, the following steps may be performed a plurality of times, to improve the accuracy of the calibration:

obtaining, based on the handheld device being used by a user to scan the three-dimensional calibration-object, and from one or more device-to-real-world coordinate transformation(s) of 2D-images of the three-dimensional calibration-object, measurement-data;

aligning, using an alignment-procedure, the measurement-data to the reference-data to obtain alignment-data;

updating, based on the alignment-data, said one or more transformation(s), thereby calibrating the scanner device;

displaying, in the graphical user-interface, an indicator to the user from which the user is guided to continue scanning the three-dimensional calibration-object.

Clearly, by iteratively updating said one or more transformation(s), said transformation(s) may keep getting better and better. At a certain point in time, the change in said transformation may be so small, that it does not add any significant value to the calibration. Accordingly, when such a point has been reached, it makes sense to stop the calibration.

Thus, in some embodiments, the step of displaying the notification (indicating that the calibration of the scanner device is completed) is based on the pre-defined criteria as just described.

In a preferred embodiment, the step of aligning is initiated by a step of receiving, by the user in the user-interface, a point on the reference 3D-representation of the three-dimensional calibration-object, to assist the step of aligning. For example, the user may click on the reference-3D representation, whereby the computer implemented method registers and receives the point. By registering this point, the step of aligning is performed with the assistance of the user. The point may for example inform the alignment procedure that this point is to be used as a starting point when the user starts scanning. The alignment procedure may by the selected point be informed of where on the reference 3D-representation the measurement-data from the scanning is to be aligned. This embodiment may provide that alignment is made more efficient, and the overall effect may be that that calibration may be made both more reliable as different regions on the calibration-object may be taken into account in the calibration. Further, this embodiment may provide that the calibration of the scanner device is completed in a time efficient manner. In other words, the calibration process may be improved in accuracy and reduced due to the interaction with the user in the user-interface.

In a more preferred embodiment, the indicator to the user from which the user is guided to continue scanning the three-dimensional calibration-object further indicates where on the three-dimensional calibration object, the user should continue scanning. For example, the user may be guided to scan a specific region on the three-dimensional calibration-object by a pointer or color on the on the reference 3D-representation. This embodiment may provide that calibration may be made both more reliable as different regions on the calibration-object may be taken into account in the calibration. Further, this embodiment may provide that the calibration of the scanner device is completed in a time efficient manner. In other words, the calibration process may be improved in accuracy and reduced due to the interaction with the user in the user-interface.

In a most preferred embodiment, the indicator is an absolute and/or relative measure of alignment-data, thereby indicating to the user of the hand-held device to which degree the user needs to continue scanning the three-dimensional calibration-object.

For example, in the most preferred embodiment, the indicator may show data coverage within a scan-volume. The data coverage may indicate to the user where in the scan-volume of the scanner device, the measurement data has been aligned to the reference model. The indicator may thus guide the user to position the scanner differently relative to the calibration object to obtain sufficiently aligned measurement data in the entire scan volume of the scanner device. Thus, by ensuring that sufficient data coverage is obtained, accurate calibration may be achieved.

By displaying the indicator as described above to the user, the user may be informed about an expected time and/or expected performance. Accordingly, the user may improve his performance with the scanner, thereby reduce the scanning time during calibration. Thus, the indicator may be a way of reducing the overall calibration-time.

Example 1—Calibration of an Intraoral Scanning System

In a first example, a non-calibrated scanning system is shown in FIG. 1*a* with an intraoral 3D scanner 1 and a connected computer 2. The scanning system is configured to record a plurality of images and to construct real-world 3D-coordinates based on these images. Based on the real-world coordinates, the scanning system is further configured to form a 3D-representation of the object being scanned.

The non-calibrated scanner system comprises a light source 4 adapted to project light on to the object to be scanned, an image sensor 3, like a CMOS sensor, for acquiring 2D images, an FPGA processor 5 (Field Programmable Gate Array) for processing a set of 2D images into 3D-information, and a processor 6 (such as an ARM processor) for buffering, compressing and ordering the 3D-information into data-packages. The data packages are passed to a WI-FI module configured to transfer the packages via a wireless connection 7 to a remote data handling service running on the computer 2.

The non-calibrated scanning system is calibrated by performing a calibration method where a 3D-calibration-object 8 is scanned. To perform the herein disclosed calibration method, a 3D digital reference representation 9 of the calibration object 8 is firstly loaded into the data handling service running on the computer 2.

Further details of the calibration method are illustrated in FIG. 1*b*. The scanning device 1 acquires depth information from the object 8 during scanning, where scanning is performed by the scanning device by adjusting a focus lens while acquiring a sequence of 2D-images. The focus lens position is shifting the plane of focus within a scan volume in the object space, where the object is located. The scan volume is defined by the spanned length of the focus lens movement together with the field-of-view of the focus lens.

The sequence of 2D images is converted into a registered sequence of 2D images 10. This sequence 10 is converted into a data set 11 with depth information in sensor coordinates (u, v, d) by performing a first transformation 12. The connected computer 2 comprises a processor 6 for processing the incoming data 11 from the scanner device 1 into a point-cloud 13 by performing a second transformation 14. Further, the processor 6 is configured for controlling an accurate reconstruction of the scanned object 8 by aligning individual point clouds 13 and fusing them together.

The second transformation 14 transforms the depth information from the scanner coordinates i.e. the in-focus pixel position (u, v) on the image sensor and the encoder position, d, describing the position of the focus lens into real-world 3D coordinates noted (x, y, z). The second transformation 14 is intended to provide a device-specific mapping from the scanner coordinates (u, v, d) to the real-world coordinates (x, y, z). Nevertheless, to begin with and up till now, the second transformation 14 is not device specific.

Upon assembly of the non-calibrated scanning device, a nominal geometry representation is loaded into the scanner device 1 to serve as the initial state of the second transformation 14, i.e. a mapping from the scanner coordinates to the real-world coordinates. This initial state of mapping transformation 14 is passed from the scanning device to the data handling service when the scanner is connected to the computer the first time.

The initial second transformation 14 may be based on a nominal optical setup that uses optical parameters to describe the setup of the scanner, i.e. how lenses are tilted and positioned, and/or how a cube is tilted with respect to the sensor etc. A generic optical arrangement may be used to ray-trace through the optical setup to transform all scanner coordinates to 3D-world-coordinates. Accordingly, due to its generic nature of the initial second transformation 14, the coordinates may not be in a perfect grid at equal distances from each other and may be more irregular. The second transformation 14 as here described defines that the scanner is a non-calibrated scanner device 1, meaning that no device-specific corrections are applied to the nominal geometry representation.

In the following, a specific scan volume calibration is applied to the non-calibrated scanner device 1, thereby replacing the initial second transformation to a highly accurate device specific second transformation 14 from scanner coordinates to real-world-coordinates.

In one embodiment, the scan volume calibration does not rely on the optical set-up of the scanner device 1 but may be based on an iterative empirical approach of scanning a known calibration-object 8. The known calibration object 8 may be a gypsum jaw model as shown in FIG. 1*a*. Further, the calibration object 8 may have been scanned with another scanning device to obtain a high-resolution reference-representation 9.

As previously described, a point-cloud 13 is formed using the initial second transformation operation 14. An individual point-cloud 13 is called a sub-scan, as it represents a subset of the full geometry of the calibration object 8. During the scan volume calibration, the non-calibrated scanner device 1 obtains during scanning of the reference-representation 8, a plurality of sub-scans. Each of the sub scans, i.e. each of the point clouds 15, are aligned to the reference-representation 9 by for example by using an Iterative Closest Point (ICP) point-to-plane registration. This alignment step can be seen in FIG. 1*b*.

Once all the sub-scans 15 are properly aligned to the reference-representation 9, the computer-implemented method iterates through all vertices 18 of subsections 17 of the scan volume for all sub-scans 15. For each vertex 18, the closest point on the reference mesh is found, and a difference vector 16 as seen from the scanner in that particular sub-scan is calculated. The result is an error in the x, y, and z-directions. Accordingly, for each pixel coordinate (u, v) and a linear position, d, there will be a set of difference vectors $v_n$ 16. These differences are used to correct the initial second transformation.

As described above, the scan volume is divided into subsections, specifically hyperrectangles, defined by a discretization of the scanner coordinates (u, v, d), i.e., image sensor coordinates and linear positions are divided into a number of fixed intervals, and the cartesian products of these intervals define the subsections of the scan volume 17.

Details of the scan volume are described in the following. The corner points $p_{ijk}=(u_i, v_j, d_k)$, $i=0 \ldots N_1$, $j=0 \ldots N_2$, $k=0 \ldots N_3$, of these subsections 18 are transformed into real-world-coordinates using the initial geometry. This results in a set $q_{ijk}=(x_i, y_j, z_k)$, $i=0 \ldots N_1$, $j=0 \ldots N_2$, $k=0 \ldots N_3$, that span the scan volume. Each $q_{ijk}$ 18 is corrected by looking within a small neighborhood of the point and seeing, which difference vectors $v_n$ 16 lie within this neighborhood. These vectors are then averaged in a weighted average based on their distance to the point that is being corrected; this weighted average becomes a correction vector $c_{ijk}$, which is then added to give a new coordinate mapping $q'_{ijk}=q_{ijk}+c_{ijk}$. This new mapping determines a new geometry calibration, i.e. determines a new second transformation 14. The real-world coordinates of any point (u, v, d) is determined by finding the hyperrectangle of the above discretization with (u, v, d), looking up the $q'_{ijk}$ for each of the 8 corners of the hyperrectangle, and performing a three-dimensional linear interpolation of the corners to find the (x, y, z) corresponding to (u, v, d). Accordingly, when the initial second transformation 14 is replaced the new second transformation 14, the generated 3D-representation is corrected. Such a process can be repeated several times to optimize the calibration. An iterative process of updating the second transformation 14 is illustrated in the flow chart in FIG. 1*c*.

Example 2—Lab Scanner System

In a second example, a non-calibrated scanning system is shown in FIG. 2 with a stationary desktop 3D scanner 1 and a connected computer 2. The scanning system is configured to record a plurality of images and to construct real-world 3D-coordinates based on these images. Based on the real-world coordinates, the scanning system is further configured to form a 3D-representation of the object being scanned.

The non-calibrated scanner system comprises a light source 4 adapted to project light on to the object to be scanned, an image sensor 3 (in this example there are four image sensors 3), like one or more CMOS sensor(s), for acquiring 2D images, an FPGA processor 5 (Field Programmable Gate Array) for processing a set of 2D images into 3D-information, and a processor 6 (such as an ARM processor) for buffering, compressing and ordering the 3D-information into data-packages. The data packages are passed to a Phy (USB/Ethernet) to transfer the packages via a wired connection 7 to a data handling service running on the computer 2.

The non-calibrated scanning system is calibrated by performing a calibration method where a 3D-calibration-object 8 is scanned. To perform the herein disclosed calibration method, a 3D digital reference-representation 9 of the calibration object is firstly loaded into the data handling service running on the computer 2. Further details of the calibration method are illustrated in FIG. 1*b*. The scanning device 1 acquires depth information from the object 8 during scanning, where scanning is performed by the scanning device by placing the reference object 8 on a rotation plate 19 and moving it around to different viewing angles in front of the image sensors 3. The object 8 is rotated on two independent rotational axes (a rotation axis and a swing axis).

The scanning device 1 acquires depth information from the scanned object by projecting a line pattern onto the object 8 while simultaneously recording multiple images of the object from the four individual cameras 3 located at fixed positions from the projector unit 4. The line pattern could be a coded pattern or a bundle of lines. In one example, a total of 30 individual lines are projected onto the object. While the object 8 is maintained in a fixed position relative to the camera units 3, the lines are smoothly swept across the object 8 by pivoting the projector unit and the four cameras 3 while recording a sequence of 2D images.

The FPGA processor 5 further controls the different positions of the calibration-object 8, the motion of the lines projected onto the object and the operation of the four individual cameras 3.

When the line pattern is swept across the object 8, image information data is transferred to the processing unit 6. Here, the information is used to triangulate the depth data by initially performing a correspondence calculation across the different camera images and lines in the different projector planes by means of a first transformation 12.

By performing a second transformation 14, the object coordinates are obtained. The method for obtaining the second transformation may be similar to the procedure described in the Example 1.

Example 3—A User-Interface to Perform Calibration

FIG. 3 shows a user-interface for guiding an operator of a non-calibrated scanner system 1 to collect scan data for performing a calibration.

This user interface as here disclosed may be advantageous in case of calibrating a handheld scanner as it may provide guidance to how the operator may position the scanner relative to the physical calibration-object 8, for example to collect data for performing a calibration.

In this example, the user interface may be as follows.

FIG. 3 shows a computer-implemented method for calibrating a scanner device 2, displayed in a graphical user-interface on a screen, comprising a first step of obtaining reference-data of a reference 3D-representation of a 3D-reference-object 8. The reference data of the reference 3D-representation may be a file, for example obtained by scanning the 3D-reference-object 8 using a high-precision 3D-scanner, such as a lab scanner or industrial grade scanner, for example shown in FIG. 2.

A second step in the computer-implemented method is as here exemplified forming, in the graphical user-interface and based on the reference-data, a reference 3D-representation 9 of the 3D-reference-object 8. When initiating a calibration, the user interface may prompt the user to choose the reference 3D-representation 9 from a library which corresponds to the 3D-reference-object 8 to be used for the calibration.

A third step in the computer-implemented method as here exemplified is obtaining, based on the handheld device 2 being used by a user to scan the reference 3D calibration-object 8, and from one or more device-to-real-world coordinate transformation(s) of 2D-images of the 3D-reference object, measurement-data.

A fourth step in the computer-implemented method as here exemplified is aligning, using an alignment-procedure, the measurement-data to the reference-data to obtain alignment-data. Thus, the calibration routine as here described may work by registering the acquired measurement-data of the calibration-object to the reference-data of the calibration-object, in particular by alignment. Registration is known to be the process of finding a spatial transformation (e.g., scaling, rotation and translation) that aligns two point clouds. The purpose of finding such a transformation includes merging multiple data sets into a globally consistent model (or coordinate frame), and mapping a new measurement to a known data set to identify features or to estimate its pose. Thus, in some embodiments, the fourth step may perform such registration that is based on alignment.

In a first embodiment, registration may be performed by firstly generating a 3D-representation of the reference 3D calibration-object by scanning it, then secondly registering the scanned 3D data to the reference-representation and then thirdly registering each individual sub-scan onto the reference-representation.

In a second embodiment, registration may be performed by registering each sub-scan onto the reference-representation during scanning. This embodiment is advantageous, as it allows for real-time visualization of the measurement-data on the reference-representation. Furthermore, the registration directly on the reference representation may increase the data quality as the calibration routine may avoid recording false data for calibration. If the calibration-object has a minor foreign object/defect captured while scanning—that data will be immediately removed from the calibration routine data pool as there do not exist a correspondence on the reference-representation. This increases the robustness of the method.

To perform the registration directly onto the reference-representation, the first acquired sub-scan may be registered onto the reference representation. The subsequent sub-scans may then rely on the alignment information from the previous sub-scans, such that the subsequent sub-scans may be registered onto the reference-representation. To register the first acquired sub-scan, the user may manually mark a point 20 on the reference-representation 9 in the user-interface (the reference-representation is shown in blue in FIG. 3), where scanning should be started. Each sub-scan may then use the marked position of the point 20 as a starting guess of the alignment and may then attempt to register the sub-scans onto the representation. Following a successful registration, sub-scans may be aligned to the representation.

In one embodiment, the registration process as described above may be a process known as the Iterative Closest Point (ICP). In a most preferred embodiment, the registration process as described above may be defined by one or more convergence criteria. The one or more convergence criteria define the performance of the registration speed and avoidance of misregistration.

A parameter of a convergence criterion may be the minimum number of matching points between a sub-scan and reference. A match may be defined by a point on the reference within a certain distance of the sub-scan point with a surface-normal pointing in roughly the same direction, i.e. the dot product between the normal-vector of the sub-scan point and the normal-vector of its correspondence on the reference is required to be greater than zero in order for it to be considered as a match.

A fifth step in the computer-implemented method as here exemplified is updating, based on the alignment-data, said one or more transformation(s), thereby calibrating the scanner device. For example, said one or more transformation(s) may be the first and/or second transformation(s) as described in relation to the first and second aspect of the present disclosure.

A sixth step in the computer-implemented method as here exemplified is forming, in the graphical user-interface and based on the alignment-data and/or said updated transformation(s), at least a part 21 of the reference 3D-object, such that said at least part 21 can be seen in comparison to the displayed reference 3D-representation 9 to show to the user where on the reference 3D-representation 9 the alignment was successful. The at least part 21 of the reference 3D object is shown in grey in FIG. 3. The at least part 21 is one or more point-clouds from one or more sub-scans. In this example, the at least part 21 is from a plurality of sub-scans.

A seventh step in the computer-implemented method as here exemplified is displaying, in the graphical user-interface, an indicator 22 to the user from which the user is guided to continue scanning the reference 3D calibration-object. In this example, the indicator 22 is a relative measure of alignment-data, thereby indicating to the user of the hand-held device to which degree the user needs to continue scanning the reference 3D calibration-object. As can be seen from FIG. 3, the indicator 22 comprises three indicators, where each of these indicators indicate that there are areas in the scan volume (bottom, mid and top) where either sufficient data (indicated by white) has been acquired and or where insufficient data (indicated by black) has been acquired.

More specifically, the indicator 22 as exemplified in FIG. 3 shows the data density of the scan volume, displayed as several 2D slices from the top to the bottom of the scan volume. When sufficient data is acquired in a specific region of a specific slice, the specific region turns from black color to white color.

The indicator 22 indicates where in the scan volume the user has collected data and where the user needs to scan further. It is used as a guidance tool to ensure that sufficient data coverage is obtained in the entire scan volume. The entire scan volume in this example is defined by a focus scanning device, having a lens moving back and forth. Thus, the entire scan volume in this example is comprised of a number of 2D images acquired with the field of view within an interval of focus lens positions.

The indicator 22 as here exemplified is defined such that the topmost image represents the top of the scan volume, and the bottommost image represents the bottom of the scan volume. The images in-between represent the intermediate areas in chronological order. The areas in the images go from black to white, when the user scans, and data in the sub-scans from the corresponding areas of the scan volume is collected. Only if a data point in the sub-scan has a correspondence on the reference representation, the point is valid and is displayed in the image, thus defining a coverage image.

The coverage frames of the indicator 22 provide visual information to the user on how to position the scanner relative to the calibration object in order to get good data coverage of each individual 2D slice as well as on all the different 2D slices by angling or tilting the scanner device 2. When one slice contains sufficient data coverage (a slice represents a certain distance from the scanner to the calibration object) that slice may turn green thereby indicating for the user to focus on acquiring data in different regions of the scan volume by either by pulling the scanner slightly away from the object or closer to the object.

The user interface may additionally provide instructions to the operator on how to obtain the desired data coverage by repositioning the scanner. This may be in the form of an animation showing the recommended movement of the scanner relative to the object 8.

Finally, a final step in the computer-implemented method as here exemplified is the displaying, in the graphical user-interface, a notification indicating that the calibration of the scanner device is completed. This may for example be indicated by the indicator 22, for example when all the slices have turned green.

The invention claimed is:

1. A non-calibrated scanning system to be modified to a calibrated scanning system based on generating a three-dimensional representation of a three-dimensional calibration-object, comprising:
   a handheld intraoral scanning device, comprising:
      a light source configured to emit light, wherein the scanning device is configured to transmit the light onto an object; and
      an image-sensor comprising a plurality of sensor elements, wherein the image-sensor is configured to form a sequence of images of the object and the light as transmitted onto the object, wherein each image comprising a plurality of pixels; and
   a processor configured for performing a calibration by performing the steps of:
      importing a reference three-dimensional representation of the calibration-object in a real-world-coordinate-system;
      registering the sequence of images into a registered sequence of images;
      transforming, using a first transformation, the registered sequence of images and at least a set of the pixels from each of said images to a dataset of coordinates of the calibration-object in the scanning-device-coordinate-system;
      transforming, using a second transformation, the dataset of coordinates of the calibration-object in the scanning-device-coordinate-system to a point-cloud of the calibration-object in a real-world-coordinate-system,
   wherein the point-cloud of the calibration-object in the real-world coordinate-system is aligned to the reference three-dimensional representation of the calibration-object in the real-world-coordinate-system using an alignment-procedure, wherein the alignment procedure is based on minimizing a first difference between the reference three-dimensional representation and the point-cloud;
      deriving, after using the alignment-procedure, a second difference between the point-cloud and the reference three-dimensional representation of the calibration-object in the real-world-coordinate-system;
      modifying, based on the second difference, the second transformation to a calibrated transformation,
   whereby the location of points in the point-clouds of the calibration-object in the real-world-coordinate-system is adjusted in three dimensions, and
   whereby the non-calibrated scanning device is modified to a calibrated scanning device; and a computer connected to the handheld intraoral scanning device, the computer comprising a display configured for:
   displaying a graphical user-interface,
   forming, in the graphical user-interface, a reference 3D-representation of the three-dimensional calibration-object,
   displaying, in the graphical user interface, an indicator indicating where in the scan volume a user has collected data and where the user needs to scan further by a pointer or color on the reference 3D-representation, and
   displaying, in the graphical user-interface, a notification indicating that the calibration of the handheld intraoral scanner device is completed.

2. The non-calibrated scanning system according to claim 1, wherein the alignment procedure is based on aligning the point-cloud to the reference three-dimensional representation by a point-to-plane registration or a point-to-point registration.

3. The non-calibrated scanning system according to claim 1, wherein:
   the image-sensor is located in a plane normal to a z-direction in the scanning-device-coordinate-system, and
   an optical element is configured to move relative to the image-sensor and along the z-direction, whereby the sequence of images of the object is formed while the optical element is moved.

4. The non-calibrated scanning system according to claim 3, wherein the processor is further configured to:
   stack the registered sequence of images along the z-direction in the scanning-device-coordinate-system to form a volume,
      wherein each image in the registered sequence of images comprises a layer in the volume, whereby the volume is comprised of a sequence of plurality of pixels;
   compute a focus-measure for:
      each of the plurality of pixels within the volume, or
      each of a plurality of groups of pixels within the volume, wherein each of the plurality of group of pixels is formed by a subset of the plurality of pixels;
   compute, based on the focus-measure, a maximum focus-measure, $z_m$, for:
      each of the plurality of pixels within the volume, whereby a subset of the plurality of pixels gets associated with $z_m$, or
      each of the plurality of group of pixels within the volume, whereby a subset of the plurality of pixels gets associated with $z_m$,
   whereby, using the first transformation, the subset of the plurality of pixels that have been associated with $z_m$ is the at least set of pixels that are transformed to the dataset of coordinates of the object in the scanning-device-coordinate-system.

5. The non-calibrated scanning system according to claim 3, wherein the step of modifying the second transformation to a calibrated transformation, whereby the location of points in the point-cloud of the object in the real-world-coordinate-system is adjusted in three dimensions, is associated with a position along the z-direction of the optical element due to the sequence of images of the calibration-object is formed while the optical element is moved.

6. The non-calibrated scanning system according to claim 5, wherein the adjustment in three dimensions, as associated with a position along the z-direction of the optical element, is defined by a higher order polynomial for each of said positions along the z-direction.

7. The non-calibrated scanning system according to claim 1, wherein the step of modifying the second transformation to a calibrated transformation, whereby the location of points in the point-cloud of the object in the real-world-coordinate-system is adjusted in three dimensions, is performed by individually adjusting each of the points in the point-cloud.

8. The non-calibrated scanning system according to claim 1, wherein the step of modifying the second transformation to a calibrated transformation, whereby the location of points in the point-cloud of the object in the real-world-coordinate-system is adjusted in three dimensions, is performed by adjusting the three dimensional location simultaneously in three directions for each point in the point-cloud.

9. The non-calibrated scanning system according to claim 1, wherein the step of modifying the second transformation to a calibrated transformation, whereby the location of points in the point-cloud of the object in the real-world-coordinate-system is adjusted in three dimensions, is performed by adding a correction-vector, comprising three direction-components, to each of the points in the point-cloud.

10. The non-calibrated scanning system according to claim 1, wherein the step of modifying the second transformation to a calibrated transformation, is defined by a look-up-table.

11. The non-calibrated scanning system according to claim 1, wherein the step of importing a reference three-dimensional representation of the calibration-object in the real-world-coordinate-system is based on importing a high-precision three-dimensional representation of the calibration-object from a scanning system that differs from the non-calibrated scanning system.

12. A system for obtaining a calibrated scanning system, comprising:
the non-calibrated scanning system according to claim 1; and
a three-dimensional calibration-object.

13. The system according to claim 12, wherein the three-dimensional calibration-object is in the shape of a dentition comprising a plurality of dental oral objects.

14. A method of calibrating a non-calibrated scanning system by performing the steps of:
providing, the system according to claim 12, thereby the non-calibrated scanning system and the three-dimensional calibration-object;
scanning the three-dimensional calibration-object using the non-calibrated scanning system, thereby scanning the three-dimensional calibration-object by using the scanning device, and thereby using the processor in the non-calibrated scanning system to perform the calibration, and
obtaining the calibrated scanning device according to claim 12.

15. A calibrated scanning system for generating a three-dimensional representation of an intraoral object, wherein the calibrated scanning system is provided by modifying the non-calibrated scanning system according to claim 1, whereby the calibrated scanning system comprises:
a scanning device, comprising:
a light source configured to emit light, wherein the scanning device is configured to transmit the light onto an object; and an image-sensor comprising a plurality of sensor elements, wherein the image-sensor is configured to form a sequence of images of the object and the light as transmitted onto the object, wherein each image comprising a plurality of pixels; and
a processor configured for performing the steps of:
registering the sequence of images;
transforming, using a first transformation, the registered sequence of images and at least a set of the pixels to a dataset of coordinates of the object in the scanning-device-coordinate-system;
transforming, using the calibrated transformation, the dataset of coordinates of the object in the scanning-device-coordinate-system to a point-cloud of the object in a real-world-coordinate-system, and
generating, based on the calibrated transformation, a calibrated three-dimensional representation of the object in the real-world-coordinate-system.

16. A computer-implemented method for calibrating a handheld intraoral scanner device, displayed in a graphical user-interface on a screen of a computer connected to the handheld intraoral scanner device, the method, comprising the steps of:
obtaining reference-data of a reference 3D-representation of a three-dimensional calibration-object;
forming, in the graphical user-interface and based on the reference-data, a reference 3D-representation of the three-dimensional calibration-object;
obtaining, based on the handheld device being used by a user to scan the three-dimensional calibration-object, and from one or more device-to-real-world coordinate transformation(s) of 2D-images of the three-dimensional calibration-object, measurement-data;
aligning, using an alignment-procedure, the measurement-data to the reference-data to obtain alignment-data;
updating, based on the alignment-data, said one or more transformation(s), thereby calibrating the scanner device;
displaying, in the graphical user-interface, an indicator to the user from which the user is guided to continue scanning the three-dimensional calibration-object;
displaying, in the graphical user-interface, an indicator indicating where in the scan volume the user has collected data and where the user needs to scan further by a pointer or color on the reference 3D-representation; and
displaying, in the graphical user-interface, a notification indicating that the calibration of the handheld intraoral scanner device is completed.

17. The computer implemented method according to claim 16, wherein the method further comprising the step of forming, in the graphical user-interface and based on the alignment-data and/or said updated transformation(s), a 3D-representation of at least a part of the three dimensional calibration-object, such that said at least part can be seen in comparison to the displayed reference 3D-representation.

18. The computer implemented method according to claim 16, wherein the method comprising repeating one or more of said steps a plurality of times until a pre-defined criterion is satisfied.

19. The computer implemented method according to claim 18, wherein the step of displaying the notification is based on the pre-defined criteria.

20. The computer implemented method according to claim 16, wherein the step of aligning is initiated by a step of receiving, by the user in the user-interface, a point on the reference 3D-representation of the three-dimensional calibration-object, to assist the step of aligning.

21. The computer implemented method according to claim 16, wherein the indicator to the user from which the user is guided to continue scanning the three-dimensional calibration-object further indicates where on the three-dimensional calibration object, the user should continue scanning.

22. The computer implemented method according to claim 16, wherein the indicator is an absolute and/or relative measure of alignment-data, thereby indicating to the user of the hand-held device to which degree the user needs to continue scanning the three-dimensional calibration-object.

\* \* \* \* \*